United States Patent [19]

Thorp et al.

[11] Patent Number: 4,858,401
[45] Date of Patent: Aug. 22, 1989

[54] CABLE DUCTING SYSTEM

[76] Inventors: Graham M. Thorp, 45 Wentworth Road, Vaucluse, New South Wales, Australia, 2030; James F. C. Allchin, 52 Bay Street,, Mosman, New South Wales, Australia, 2088; Geoffrey F. Marquis, C/- Union Club, Bent Street, Sydney, New South Wales, Australia, 2000; Dino Burattini, 42 Chamberlain Avenue, Rose Bay, New South Wales, Australia, 2029; Peter J. Watt, 32 Tryon Road,, Lindfield, New South Wales, Australia, 2070

[21] Appl. No.: 144,732

[22] Filed: Jan. 15, 1988

Related U.S. Application Data

[63] Continuation of Ser. No. 852,662, filed as PCT AU85/00003 on Feb. 4, 1985, published as WO86/01244 on Feb. 27, 1986, abandoned.

[30] Foreign Application Priority Data

Jul. 8, 1984 [AU] Australia .............................. PG6443

[51] Int. Cl.[4] .............................................. E04B 5/48
[52] U.S. Cl. ........................................ 52/100; 52/221
[58] Field of Search ............... 52/220, 221, 671, 674, 52/98, 100, 801, 808, 792; 174/48, 49; 220/3.8

[56] References Cited

U.S. PATENT DOCUMENTS

| 1,223,750 | 4/1917 | Wakefield ....................... 220/3.8 X |
| 1,611,373 | 12/1926 | Reagan . |
| 1,626,570 | 4/1927 | Walker . |
| 1,979,804 | 11/1934 | Lutz . |
| 2,215,918 | 9/1940 | Fay ................................... 52/792 |
| 2,313,135 | 3/1943 | Fay ................................... 52/792 |
| 2,599,162 | 6/1952 | Brown ............................... 220/3.8 |
| 2,975,559 | 3/1961 | Hedgren ............................ 52/98 |
| 3,063,592 | 11/1962 | Fork .................................. 220/3.8 |
| 3,074,208 | 1/1963 | Seidel . |
| 3,093,933 | 6/1963 | Slingluff . |
| 3,380,208 | 4/1968 | Cook .................................. 52/704 |
| 3,408,094 | 10/1968 | Flachbarth et al. ................ 285/90 |
| 3,417,191 | 12/1968 | Fork . |
| 3,420,018 | 1/1969 | Fork . |
| 3,426,492 | 2/1969 | Fork . |
| 3,426,802 | 2/1969 | Fork . |
| 3,435,568 | 4/1969 | Hoseason et al. . |
| 3,453,791 | 7/1969 | Fork . |
| 3,459,875 | 8/1969 | Fork . |
| 3,471,629 | 10/1969 | O'Leary . |
| 3,479,779 | 11/1969 | Ziegler ................................ 52/144 |
| 3,494,381 | 2/1970 | Fork . |
| 3,545,150 | 12/1970 | Butler . |
| 3,592,956 | 7/1971 | Fork . |
| 3,609,210 | 9/1971 | Guritz . |
| 3,698,145 | 10/1972 | Newman et al. . |
| 3,701,837 | 10/1972 | Fork . |
| 3,721,051 | 3/1973 | Fork . |
| 3,724,148 | 4/1973 | Bregenzer . |
| 3,757,481 | 9/1973 | Skinner .............................. 52/265 |
| 3,793,793 | 2/1974 | Dobbins . |
| 3,803,341 | 4/1974 | Klinkman et al. . |
| 3,818,659 | 6/1974 | Anderson . |

(List continued on next page.)

FOREIGN PATENT DOCUMENTS

| 25221 | 2/1969 | Australia . |
| 837813 | 3/1970 | Canada ............................... 52/792 |
| 0114065 | 7/1984 | European Pat. Off. . |
| 578270 | 7/1976 | Switzerland ....................... 174/48 |
| 609852 | 6/1978 | U.S.S.R. ............................. 52/808 |
| 409090 | 4/1934 | United Kingdom ................ 220/3.8 |
| 470593 | 8/1937 | United Kingdom . |
| 2016058A | 9/1979 | United Kingdom . |
| 82/02732 | 8/1982 | World Int. Prop. O. . |

Primary Examiner—Henry E. Raduazo
Attorney, Agent, or Firm—Marshall, O'Toole, Gerstein, Murray & Bicknell

[57] ABSTRACT

The invention provides (FIG. 1) a floor support module for placing a cable between a floor (1) and a base (9) comprising a formation (FIG. 9) having a set of parallel cable ducts (10) each partitioned from neighboring ducts (20), each duct (10) being upwardly closed and, being provided at intervals along its length with a hollow upstanding projection (30) which provides access from floor (1) to duct (10). If desired segregated cables may be laid in ducts (20) or transverse ducts (10, 20) between projections (30). In preferred embodiments the formation supports a floor load upon load bearing surfaces (34) of upstanding projections (30).

20 Claims, 5 Drawing Sheets

U.S. PATENT DOCUMENTS

| | | |
|---|---|---|
| 3,851,674 | 12/1974 | Fork . |
| 3,886,702 | 6/1975 | Fork . |
| 3,903,666 | 9/1975 | Fork . |
| 3,908,323 | 9/1975 | Stout . |
| 3,932,696 | 1/1976 | Fork . |
| 3,943,272 | 3/1976 | Carroll et al. . |
| 3,943,673 | 3/1976 | Lindahl et al. ............ 52/98 |
| 3,962,835 | 6/1976 | Little ..................... 52/73 |
| 3,965,629 | 6/1976 | Pearson . |
| 3,973,366 | 8/1976 | Balane et al. . |
| 4,012,873 | 3/1977 | Lindner . |
| 4,012,874 | 3/1977 | Brogan et al. . |
| 4,030,259 | 6/1977 | Meckler . |
| 4,040,755 | 8/1977 | Jorgensen et al. . |
| 4,065,896 | 1/1978 | Penczak . |
| 4,096,347 | 6/1978 | Penczak et al. . |
| 4,125,977 | 1/1979 | Michlovic . |
| 4,139,725 | 2/1979 | Guritz et al. . |
| 4,165,592 | 8/1979 | Blankenship . |
| 4,172,962 | 10/1979 | Legerius et al. ............ 174/53 |
| 4,178,469 | 12/1979 | Fork . |
| 4,194,332 | 3/1980 | Fork . |
| 4,209,660 | 6/1980 | Flachbarth et al. . |
| 4,220,808 | 9/1980 | Fujita ..................... 174/48 |
| 4,244,484 | 1/1981 | Guritz et al. . |
| 4,286,630 | 9/1981 | Happer . |
| 4,326,366 | 4/1982 | Werner . |
| 4,338,484 | 7/1982 | Littrell . |
| 4,341,919 | 7/1982 | Kohaut . |
| 4,411,121 | 10/1983 | Blacklin ................... 52/792 |
| 4,454,692 | 6/1984 | Ault ...................... 52/221 |
| 4,465,897 | 8/1984 | Albrecht . |
| 4,499,332 | 2/1985 | Shea et al. . |
| 4,523,416 | 6/1985 | Payne et al. . |
| 4,554,771 | 11/1985 | Marwah et al. . |
| 4,558,546 | 12/1985 | Nusbaum . |
| 4,559,749 | 12/1985 | Nusbaum . |
| 4,580,379 | 4/1986 | Nusbaum . |
| 4,594,826 | 6/1986 | Gray ...................... 52/221 |
| 4,736,561 | 4/1988 | Lehr ...................... 52/801 |

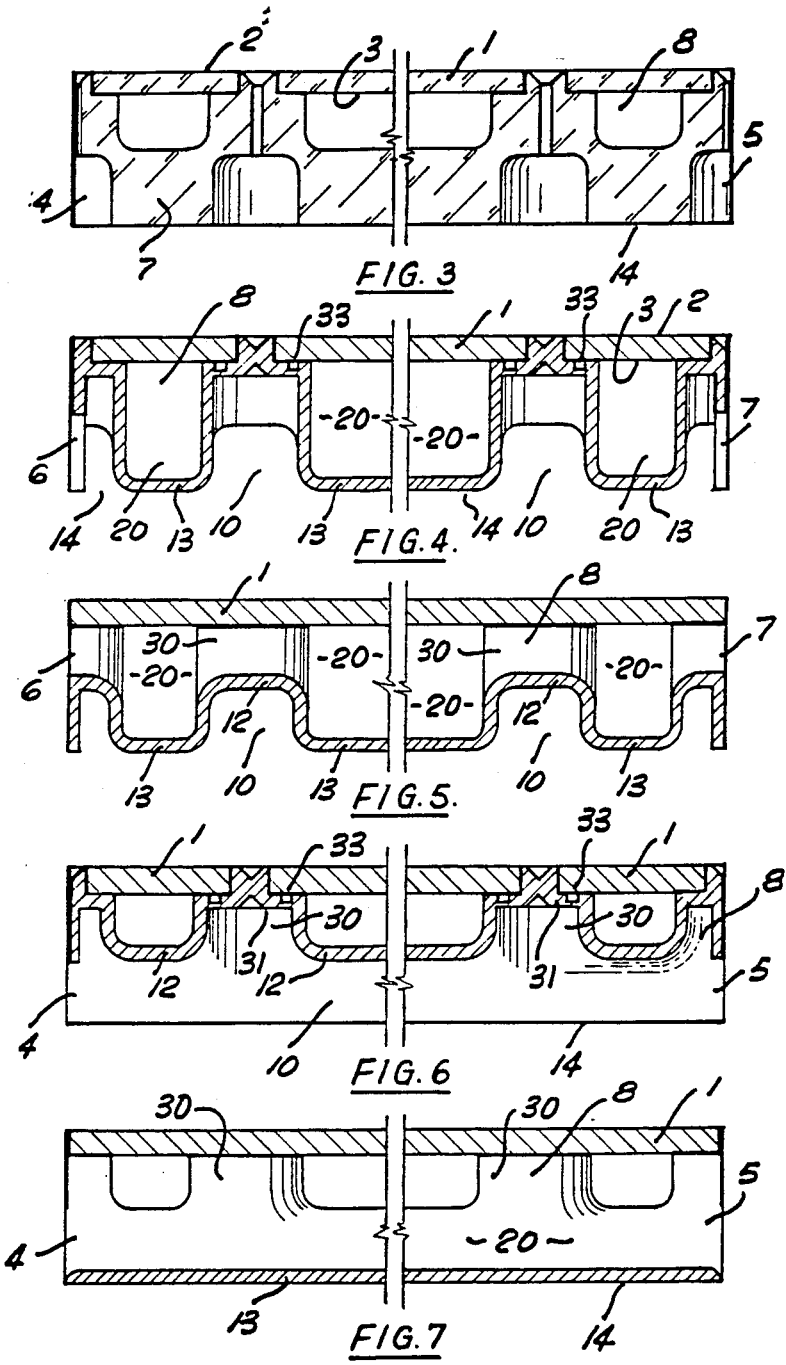

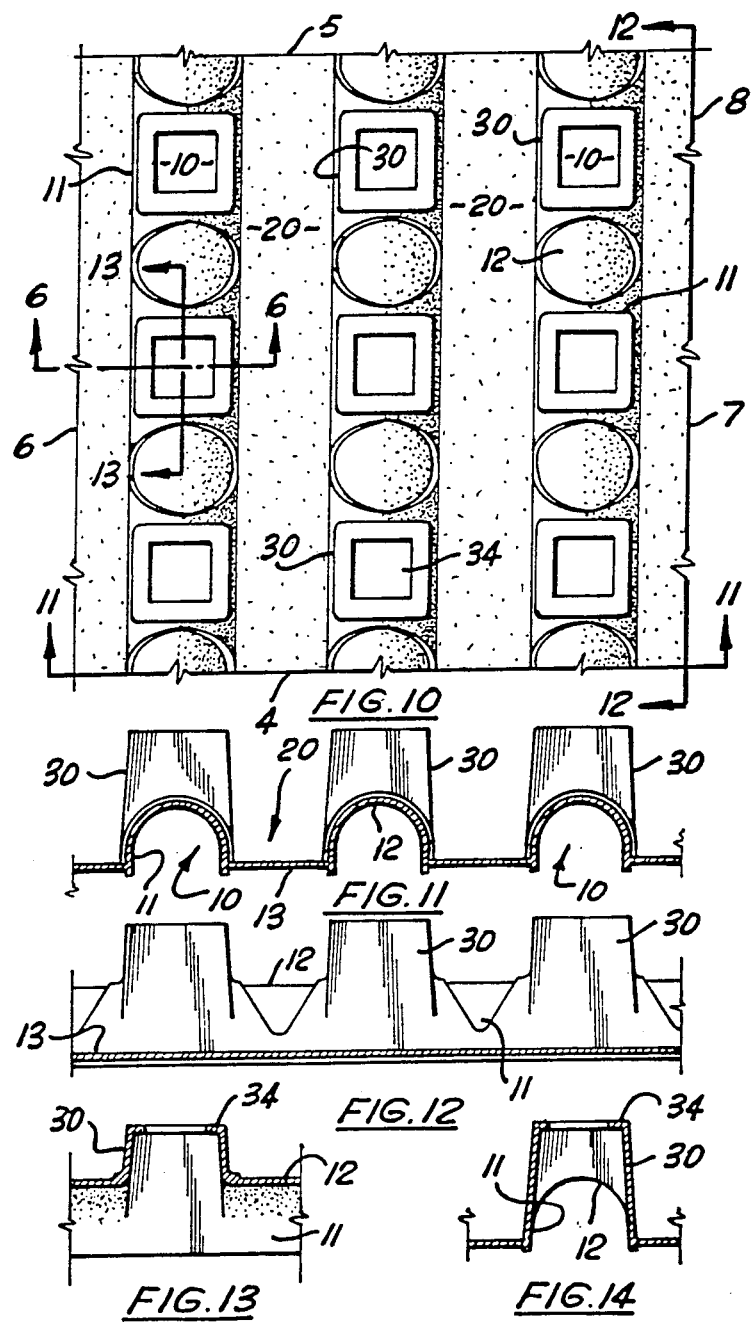

CABLE DUCTING SYSTEM

This application is a continuation of application Ser. No. 852,662 filed as PCT AU85/00003 on Feb. 4, 1985, published as WO86/01244 on Feb. 27, 1986, now abandoned.

FIELD OF THE INVENTOR

This invention relates to a system facilitating the installation of cable and other services in a building.

BACKGROUND ART

With increasing automation of offices it has become commonplace for desks or workstations to require an electricity supply outlet and/or a telephone connection and/or one or more signal cable connections to data processing or other equipment.

The provision of such services to a desk or other workstation at a particular location in a building usually presents problems. The problems are exacerbated when, for example, the workstation is in an open plan, broadloom carpeted area in a modern concrete floored high-rise office building.

It has been practiced to lay metal underfloor ducts prior to pouring concrete flooring during building construction. Such ducts are costly to manufacture and install and are usually widely spaced in the poured floor to keep floor ducting costs to a minimum.

Access to ducts embedded in concrete floors generally requires taking up of any carpet. Access may then be gained via access trenches at predetermined locations or by undersirable jackhammer penetration of the concrete floor.

Because ducts provided on a contingency basis during building construction tend to be widely spaced, it is rare that duct access is available close to an exact location where services are required. Consequently either a desk must be moved to a location adjacent a service duct or else, a cable must be run from the nearest duct to the desk over carpet or between carpet and floor.

If the building is provided with a ceiling space in which service cables may be run then the service must be brought from the ceiling down to a workstation. That is generally unslightly especially in large open plan areas or requires over carpet cable from a vertical duct or pillar. In all such systems it is undesirable that AC power cables run in the same duct as communication cables, both for safety reasons and to reduce pickup in communication cables of hum or spikes from the power cables.

It is therefore generally difficult to avoid an unsightly tangle of communication and power cables in the vicinity of work stations while provided adequate segregation of services.

An object of the present invention is to provide a method of, and apparatus for, ducting cables which alleviates at least some of the disadvantages of the above discussed systems.

DISCLOSURE OF THE INVENTION

According to one aspect the invention consists in a floor support module for placing a cable between a floor component and an underlying base, the module comprising:

a formation adapted to support a floor component spaced above a base, the formation including a first set of parallel cable ducts, each of said ducts being partitioned from neighbouring ducts and being upwardly closed, each duct of the set being provided at locations along its length with a hollow upstanding projection, the hollow interior of the projection being in communication with the underlying duct and being segregated from neighbouring ducts.

In preferred embodiments of the invention each module includes a floor sheet supported upon, or secured to, the upstanding projections and each formation is provided with an adhesive coating on its lower surface. In use a plurality of the preferred modules may be laid end to end and side by side on a concrete or other base, the floor sheets providing a floor surface spaced above the base. The floor so constructed may be carpeted and has a system of closely neighbouring communicating parallel ducts extending from one end to the other and has passageways extending transverse the ducts and isolated from the ducts. Access to a set of enclosed ducts may readily be obtained from the floor sheet via the hollow upstanding projections as will be described in more detail hereinafter and access may also be obtained to other of the ducts at locations intermediate the projections while preserving cable segregation of cables in neighbouring ducts.

The invention allows the use of broadloom carpet over the floor and facilitates cable installation and access without necessitating carpet uptake. The invention allows cable to be installed after building construction and with only marginal reduction in floor to ceiling height. Other advantages of the invention will become apparent from the following description.

BRIEF DESCRIPTION OF THE DRAWINGS

Various embodiments of the invention will now be described with reference to the accompanying drawings wherein:

FIG. 3 shows the module of FIG. 1 in end elevation on line 3—3 of FIG. 1.

FIG. 4 shows a sectional view on line 4—4 of FIG. 1.

FIG. 5 shows a sectional view on line 5—5 of FIG. 1.

FIG. 6 shows a sectional view on line 6—6 of FIG. 1.

FIG. 7 shows a sectional view on line 7—7 of FIG. 1.

FIG. 10 shows the formation of FIG. 9 in plan as viewed from above.

FIG. 11 shows an end elevation of the formation of FIG. 10 on line 11—11.

FIG. 12 shows an end elevation of the formation of FIG. 10 on line 12—12.

FIG. 13 shows a cross-section throug a part of the formation of FIG. 10 on line 13—13.

FIG. 14 shows a cross-section through a part of the formation of FIG. 10 on line 14—14.

Parts of each embodiment which correspond in function are identified in the drawings with corresponding numerals.

DESCRIPTION OF PREFERRED EMBODIMENTS

Figure 1:
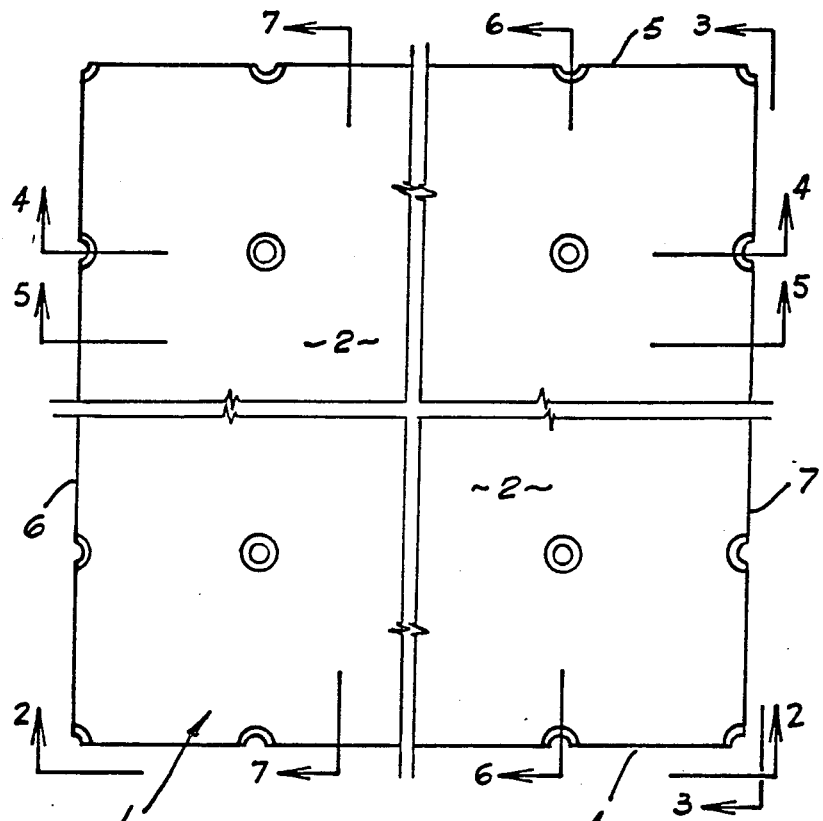
FIG. 1 shows a module including a formation according to the invention viewed in plan from above.

With reference to FIG. 1-7 there is shown a portion of a module of substantially rectalinear plan and including a floor sheet 1 having an upper surface 2, a lower surface 3, and edges 4,5 and side edges 6,7. Floor sheet 1 is for example of hardboard and 50 cm×50 cm.

Figure 2:
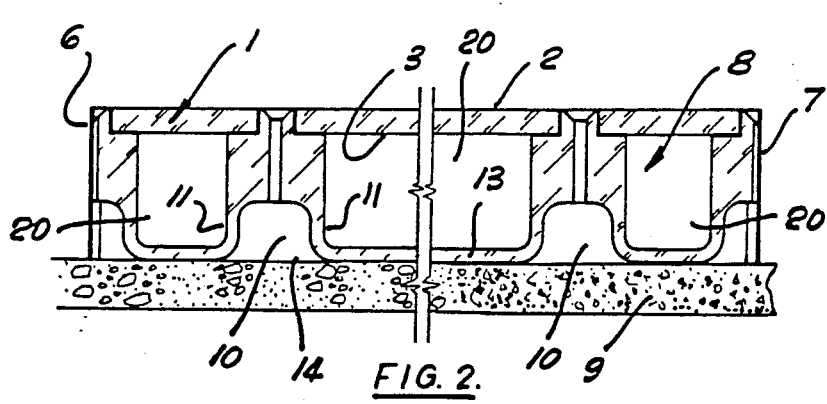
FIG. 2 shows the module of FIG. 1 in a first end elevation on line 2—2 of FIG. 1.

A formation 8 is adapted to support floor sheet 1 above a base, for example a concrete floor 9 (shown in part in FIG. 2). Formation 8 is moulded from polypropylene and defines a first set of ducts 10 extending from end 4 to end 5 each duct 10 being defined between duct side wall 11 and being upwardly closed by a duct ceiling 12. Channels 20 are defined between walls 11 of neighbouring ducts 10 and by channel floors 13 and are upwardly open towards the underside of sheet 1. As best seen in FIG. 5 (which shows a cross-section on line 5—5 of FIG. 1) the upper portion of a side wall 11 blends with a ceiling 12 of a duct 10 and the lower portion of a wall 11 blends with channel floor member 13 to form a corrugated profile in which adjacent walls 11 are connected alternately at a crest by a ceiling member 12 or at a valley by a channel floor member 13. Ceiling members 12 of ducts 10 are at approximately mid height between channel floor members 13 and supported floor sheet 1.

Formation 8 thus provides a plurality of closely neighbouring longitudinally extending channels or ducts including one set of upwardly closed, downwardly open, ducts 10 and another set of downwardly closed, upwardly open channels 20 segregated from the first set of ducts. Channel floor members 13 are substantially coplanar on the lower exterior surfaces and are thereby adapted for seating of the module formation on a flat surface for example a concrete floor.

In the embodiment illustrated in FIG. 1-7 ducts 10 are provided with an array of spaced hollow tubular upstanding projections 30 of which the hollow interior of each is in communication at the base with a duct 10 through duct ceiling 12. With reference to FIG. 4 upstanding projection 30 is provided with a substantially flat upfacing capital 31 and upwardly facing rim 34 adapted to support floor sheet 1. Floor sheet 1 in the present example is desirably secured to projections 30 by countersunk fasteners, for example rivets or screws, or by moulded formations 34 provided on capital 31 which are keyed to or interlocked with corresponding formations provided on floor sheet 1 or by an adhesive. In addition all or a portion of capital 31 may be weakened as at 33 (FIG. 6) to facilitate removal and give access to a duct 10 via a hollow projection 30. Capital 31 is not essential and projections 30 may be of sufficient strength to support a floor load on rims 34.

In use a plurality of the modules of FIG. 1 are laid in end-to-end and edge-to-edge assembly in a tile like manner. For preferance the modules are also bonded at the exterior lower surface of members 13 to the underlying base 9 using a contact adhesive which may be precoated on formation 8. In this way a large area of concrete base 9 may quickly be covered with the modules to produce a floor spaced above the base. Then the upper surface 2 of floor sheets 1 may be covered with a broadloom carpet.

Desirably, the polypropylene spacer formation 8 is made sufficiently strong to withstand uniformly distributed floor loads in excess of 200 pounds per square foot (P.S.F) and concentrated loads such as may occur if a man swivels on one leg of a chair or if office equipment is moved on a trolley. The modules are laid in such a way that channels 10 and 20 of one module communicate end-to-end with corresponding channels of an adjacent module to provide a plurality of closely neighbouring longitudinally extending cable ducts intermediate floor sheet 1 and an underlying surface 9.

With reference to FIG. 9-14 there is shown a second embodiment of a module according to the invention. The second embodiment is a moulded formation which is adapted to support a floor sheet which need not be united with the formation.

Upstanding formations 30 are of a substantially rectangular cross-section at the upper ends thereof.

A flanged rim 34 defines an upper opening and provides a load bearing surface for supporting a floor element now shown.

Walls 11 of ducts 10 are thicker at and adjacent the base of projections 30 than at duct locations intermediate projections 30 at points which are substantially not floor load bearing.

If services are required at a particular floor location, one end of ducts 10 and channels 20 is exposed at or adjacent a perimeter of the area covered by modules. An electricity supply cable is then fed from the perimeter through a duct 10 to a desired location.

Because the ducts are closely neighbouring a duct 10 or channel 20 may readily be selected which passes within centimeters of the location.

A detector, for example, a metal detector is employed to sense the position of the cable end and the cabled direction. When the end of the cable is sensed at the desired location, a slit is made in the carpet overlying the cable and in alignment with the duct 10 in which the cable is situated. Access to cable channel 10 may be gained via a hollow projection 30 which will be found below the slit in the carpet, centered on the cable line, and which will be within a few centremeters of the desired location.

Hollow projection 30 is opened by removing all or part of capital 31 by drilling, by removing a knock-out tab provided, or by similar means.

A telephone cable may be similar methods be laid in an adjacent channel 20 which is isolated from duct 10 by partitions 11. Ducts 10 form a set each of which is partitioned from adjacent channels 20 by a non-conductive polyethylene barrier. Therefore the electricity cable is electrically and mechanically isolated from the phone line. If preferred the phone line may be laid in a duct spaced further apart from that containing the power line to reduce further pick-up. In the embodiment described computer cables or other services may be installed in passages extending in a direction transverse ducts 10 and channel 20 or diagonally thereto by pulling those cables between formations 30. Such transverse cables are also electrically isolated from any cable in ducts 10.

Figure 8:
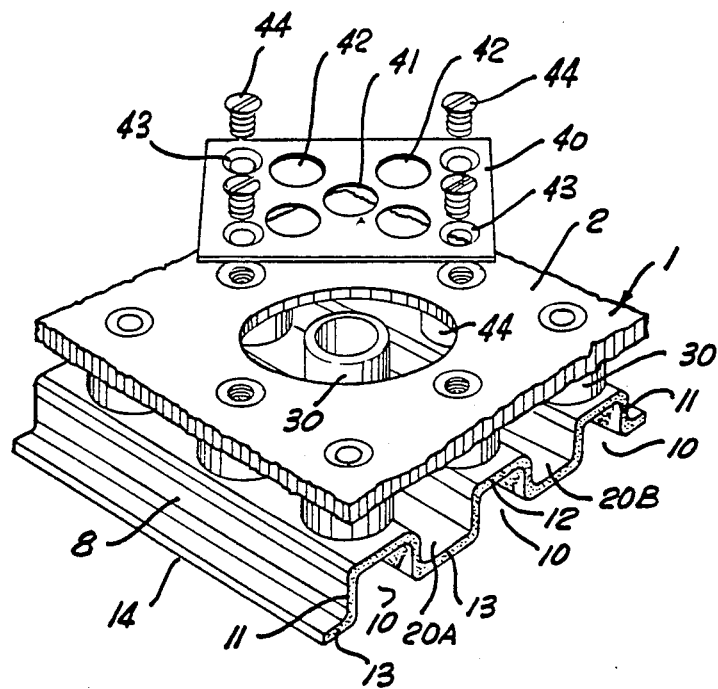
FIG. 8 shows a perspective partly exploded view of an embodiment of an outlet assembly for use with a module such as shown in FIG. 1.
Figure 9:
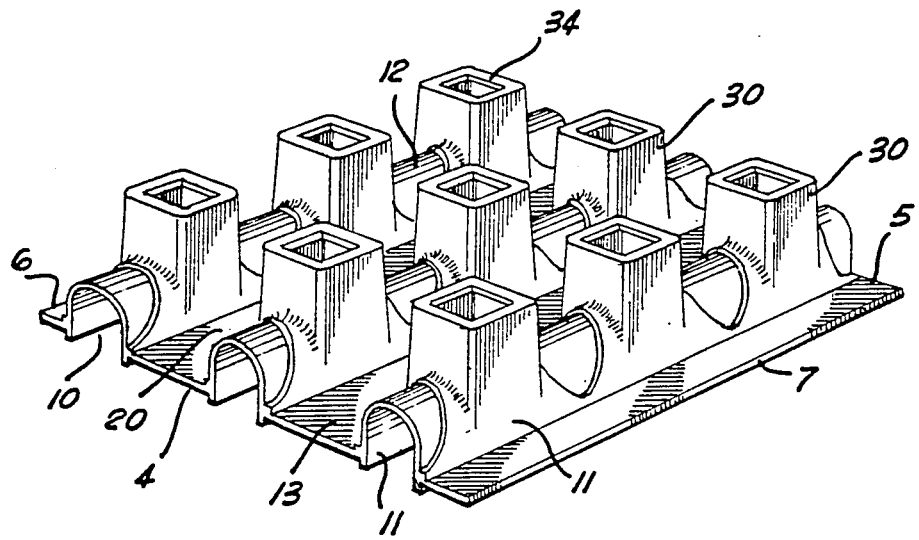
FIG. 9 shows a second embodiment of a formation according to the invention in a general perspective view.

Neat access to ducts 10 and channels 20 may be obtained by use of connector plates 40 shown with reference to FIG. 8. A circular aperture 44 centered on a projection 30 center is first drilled in sheet 1 and then covered with a plate 40. Plate 40 has an aperture 41 and four apertures 42 and is provided with mounting holes 43 to receive fasteners 44. Holes 41 communicate with a projection 30 and thus with a duct 10 of a module such as shown in FIG. 1. Two apertures 42 communicate with a left adjacent duct 20A as viewed in FIG. 8, and two communicate with a right adjacent duct 20B. Aperture 42 also communicates with transverse passageways extending between projections 30. Plate 40 is adapted for fastening to the floor sheet 1 by means of fastner levels 43 and screws or other fasteners 44.

For preference modules are supplied with the floor sheet 1 fastened to or integral with spacer formation 8 and with the lower surface of the spacer formation precoated with contact adhesive (not illustrated). It will be understood however that the spacer formation 8 need not be adhered or mounted to the underlying base, or may be adapted for mounting to an underlying base by other means for example explosive fasteners. Likewise floor sheet 1 need not be pre-fastened to or integral with the spacer formation 8 although that is preferred. One method of connecting a floor sheet to the spacer formation is by means of upwardly projecting split spigots disposed in an array, integrally moulded with formation 8 and each of which is compressed in a radial direction and received in a bore of the floor sheet concentric with the spigot. The spigot resiliently engages he walls of the bore retaining the floor sheet.

For preference spacer formation 8 is moulded but it may be made by other methods and may be constructed from materials other than polypropylene. Spacer formation 8 may also be manufactured with profiles other than those illustrated. Spacer formation 8 is desirably provided with a flat lower surface or coplanar lower surfaces so that it sits firmly on a base and for preference is sufficiently resilient to accommodate imperfections in the base.

Spacer formation 8 is desirably provided with a flat upper surface, or coplanar upper surfaces, adapted to support an area of floor sheet. In the present example the walls of projections 30 and partitions 11 support the floor load. In a preferred embodiment the module when installed has upper surface 1 at a height of 50 mm above the substrate base level and the polypropylene of formation 8 has a wall thickness of about 2 mm.

The invention enables services to be provided with precision to a desired location in a work area without take up of broadloom carpet. As will be apparent to those skilled in the art the apparatus and methods take other embodiments without departing from the scope hereof and all such embodiments are deemed to be within the scope hereof.

We claim:

1. A module for use in supporting a floor load above a base, comprising:
   a formation defining a first set of upwardly-closed parallel cable ducts, each segregated from the other,
   each of the said ducts having spaced-apart hollow upstanding projections having a weakened portion forming a frangible closure for providing access to the interior of said duct, and
   a floor sheet supported on said upstanding projections and adapted to cooperate therewith to support a floor load.

2. A module according to claim 1 wherein a cable passageway is defined between a plurality of said upstanding projections, the passageway extending in a plane between the floor sheet and ducts of the first set, the passageway extending transversely of said ducts and being segregated from the ducts.

3. A module according to claim 1 comprising a second set of cable ducts or channels parallel with and segregated from the first set.

4. A module according to claim 3 wherein the second set includes a channel open to the underside of the floor sheet.

5. A module according to claim 1 wherein adjacent upstanding projections are spaced at intervals of less than 20 cm.

6. A formation adapted to be sandwiched between a floor sheet and a base, the formation comprising:
   a structure defining at least two parallel segregated cable ducts, each duct having spaced-apart hollow upstanding projection shaving a weakened portion forming a frangible closure for providing access to the interior of said duct,
   a plurality of said projections having a laterally extending flange or surface and being adapted in combination to act as the sole support for a floor sheet and a floor load to be spaced above the base.

7. A formation according to claim 6 wherein said hollow upstanding projections are each closed at the upper end thereof by a substantially flat upfacing capital including a frangible portion forming said closure.

8. A formation according to claim 6 comprising a second set of cableducts or channels parallel with and segregated from the first set.

9. A formation according to claim 8 wherein the second set includes an upwardly open channel intermediate two ducts of the first set.

10. A formation according to claim 6 in combination with a floor sheet supported upon laterally extending surfaces of the hollow upstanding projections.

11. A formation according to claim 6 wherein a plurality of passageways are defined between the floor sheet and the formation, said passageways extending between the projections and transverse the ducts.

12. A floor structure comprising a plurality of floor load bearing formations supported on a base, each formation including a first set of parallel. segregated, upwardly closed cable ducts, each duct of the set being provided with a plurality of spaced-apart holow upstanding projections providing access to the interior of said duct, said projections being capable of supporting a floor sheet carrying a floor load of at least 200 lbs. per square foot, the formations being disposed in edge-to-edge array extending in two dimensions and having the ducts of one formation in communication with ducts of a neighbor.

13. A floor structure according to claim 12 further comprising at least one floor sheet supported upon the plurality of formations.

14. A floor structure according to claim 13 wherein at least one passageway extends transversely of the ducts of the first set, intermediate said ducts and the floor sheet, the ducts being segregated from the transverse passageway.

15. A floor structure according to claim 12 wherein each formation supports a respective overlying floorsheet, said floorsheets being a contiguous edge-to-edge array.

16. A floor structure according to claim 15 wherein at least one passageway wxtends transversely of the ducts of the first set, intermediate said ducts and said floor sheets, the ducts being segregated from the transverse passageway.

17. A floor structure according to claim 12 comprising at least one floor sheet for supporting a floor load overlying a formation and a cable extending from a duct of the formation through an upstanding formation and through said floor sheet.

18. A floor structure according to claim 12 wherein the formation comprise an upwardly open channel intermediate a pair of ducts of the first set.

19. A floor structure according to claim 18 wherein upwardly open channels alternate with downwardly open ducts in a corrugated configuration.

20. A floor structure according to claim 12 wherein upwardly extending projections are provided with an upfacing capital or flange adapted for load bearing.

* * * * *